US012705501B2

(12) United States Patent
Chen et al.

(10) Patent No.: US 12,705,501 B2
(45) Date of Patent: Aug. 11, 2026

(54) DETERMINING HYPERPARAMETERS USING SEQUENCE GENERATION NEURAL NETWORKS

(71) Applicant: Google LLC, Mountain View, CA (US)

(72) Inventors: Yutian Chen, Cambridge (GB); Xingyou Song, Jersey City, NJ (US); Chansoo Lee, Pittsburgh, PA (US); Zi Wang, Cambridge, MA (US); Qiuyi Zhang, Pittsburgh, PA (US); David Martin Dohan, San Francisco, CA (US); Sagi Perel, Pittsburgh, PA (US); Joao Ferdinando Gomes de Freitas, London (GB)

(73) Assignee: Google LLC, Mountain View, CA (US)

( * ) Notice: Subject to any disclaimer, the term of this patent is extended or adjusted under 35 U.S.C. 154(b) by 718 days.

(21) Appl. No.: 18/199,886

(22) Filed: May 19, 2023

(65) Prior Publication Data

US 2023/0401451 A1 Dec. 14, 2023

Related U.S. Application Data

(60) Provisional application No. 63/344,032, filed on May 19, 2022.

(51) Int. Cl.
*G06N 3/0985* (2023.01)
*G06N 3/0455* (2023.01)
(Continued)

(52) U.S. Cl.
CPC ......... *G06N 3/0985* (2023.01); *G06N 3/0455* (2023.01); *G06N 3/09* (2023.01); *G06N 3/092* (2023.01)

(58) Field of Classification Search
CPC ........ G06N 3/0455; G06N 3/09; G06N 3/092; G06N 3/0985; G06F 40/284
See application file for complete search history.

(56) References Cited

U.S. PATENT DOCUMENTS

2021/0027770 A1* 1/2021 Olabiyi .................. G06F 40/30
2021/0304074 A1* 9/2021 Zaremoodi .............. G06N 3/09
2022/0050973 A1* 2/2022 Calapodescu ........... G06F 40/42

OTHER PUBLICATIONS

[No Author Listed], "ECMA-404 the JSON Data Interchange Syntax," TC39, Dec. 2017, 2:16 pages.

(Continued)

*Primary Examiner* — Andrew L Tank
(74) *Attorney, Agent, or Firm* — Fish & Richardson P.C.

(57) ABSTRACT

Methods, systems, and apparatus, including computer programs encoded on computer storage media, for training a machine learning model. One of the methods includes receiving metadata for the training, generating a metadata sequence that represents the metadata, at each of a plurality of iterations: generating one or more trials that each specify a respective value for each of a set of hyperparameters, comprising, for each trial: generating an input sequence for the iteration that comprises (i) the metadata sequence and (ii) for any earlier trials, a respective sequence that represents the respective values for the hyperparameters specified by the earlier trial and a measure of performance for the trial, and processing an input sequence for the trial that comprises the input sequence for the iteration using a sequence generation neural network to generate an output sequence that represents respective values for the hyperparameters.

21 Claims, 4 Drawing Sheets

(51) Int. Cl.
*G06N 3/09* (2023.01)
*G06N 3/092* (2023.01)

(56) References Cited

OTHER PUBLICATIONS

Adiwardana et al., "Towards a human-like open-domain chatbot," CoRR, Submitted on Feb. 27, 2020, arXiv:2001.09977v3, 38 pages.
Agarwal et al., "Analyzing the nuances of transformers' polynomial simplification abilities," Presented at Mathematical Reasoning in General Artificial Intelligence Workshop at ICLR, Virtual Conference, May 3-7, 2021, 16 pages.
Bardenet et al., "Collaborative hyperparameter tuning," Presented at Proceedings of the 30th International Conference on Machine Learning, Atlanta GA, Jun. 16-21, 2013, 9 pages.
Bergstra et al., "Hyperopt: A python library for optimizing the hyperparameters of machine learning algorithms," Presented at Proceedings of the 12th Python in Science Conference, Austin, TX, Jun. 24-29, 2013, pp. 13-19.
Brown et al., "Language models are few-shot learners," CoRR, Submitted on Jul. 22, 2020, arXiv:2005.14165v4, 75 pages.
Charton, "Linear algebra with transformers," CoRR, Submitted on Dec. 3, 2021, arXiv:2112.01898v1, 24 pages.
Chen et al., "Decision transformer: Reinforcement learning via sequence modeling," Presented at Advances in Neural Information Processing Systems, Virtual Conference, Dec. 6-14, 2021; Advances in Neural Information Processing Systems 34, Dec. 2021, 14 pages.
Chen et al., "Evaluating large language models trained on code," CoRR, Submitted on Jul. 14, 2021, arXiv:2107.03374v2, 35 pages.
Chen et al., "Generative pretraining from pixels," Presented at Proceedings of the 37th International Conference on Machine Learning, Virtual Conference, Jul. 13-18, 2020, 13 pages.
Chen et al., "Learning to learn without gradient descent by gradient descent," Presented at Proceedings of the 34th International Conference on Machine Learning (ICML), Sydney, Australia, Aug. 6-11, 2017, 9 pages.
Cho et al., "Basic enhancement strategies when using Bayesian optimization for hyperparameter tuning of deep neural network," IEEE Access, Mar. 16, 2020, 8:52588-52608.
Cowen-Rivers et al., "An empirical study of assumptions in bayesian optimisation," CoRR, Submitted on Feb. 11, 2021, arXiv:2012.03826v2, 33 pages.
Devlin et al., "BERT: pre-training of deep bidirectional transformers for language understanding," Presented at Proceedings of the 2019 Conference of the North American Chapter of the Association for Computational Linguistics: Human Language Technologies, Minneapolis MN, Jun. 2-7, 2019, pp. 4171-4186.
Dosovitskiy et al., "An image is worth 16x16 words: Transformers for image recognition at scale," Presented at 9th International Conference on Learning Representations, ICLR 2021, Austria (virtual event), May 3-7, 2021, 21 pages.
Duan et al., "RL2: Fast reinforcement learning via slow reinforcement learning" CoRR, Submitted on Nov. 10, 2016, arXiv:1611.02779v2, 14 pages.
Elhara et al., "COCO: The large scale black-box optimization benchmarking (bbob-largescale) test suite," CoRR, Submitted on Mar. 28, 2019, arXiv:1903.06396v2, 11 pages.
Feurer et al., "Initializing bayesian hyperparameter optimization via meta-learning," Presented at Proceedings of the AAAI Conference on Artificial Intelligence, Austin TX, Jan. 25-30, 2015, 1128-1135.
Feurer et al., "Scalable meta-learning for bayesian optimization using ranking-weighted gaussian process ensembles," Presented at AutoML Workshop at ICML, Stockholm, Sweden, Jul. 10-15, 2018, 15 pages.
Fujimoto et al., "Off-policy deep reinforcement learning without exploration," Presented at Proceedings of the 36th International Conference on Machine Learning (PMLR), Long Beach CA, Jun. 9-15, 2019, 11 pages.
Golovin et al., "Google Vizier: A service for black-box optimization," Presented at Proceedings of the 23rd ACM SIGKDD International Conference on Knowledge Discovery and DataMining, Halifax, Canada, Aug. 13-17, 2017, pp. 1487-1496.
Golovin et al., "Gradientless descent: High-dimensional zeroth-order optimization," Presented at 8th International Conference on Learning Representations (ICLR), Addis Ababa, Ethiopia, Apr. 26-30, 2020, 21 pages.
Gulcehre et al., "Regularized Behavior Value Estimation," CoRR, Submitted on Mar. 17, 2021, arXiv:2103.09575v1, 28 pages.
Kennedy et al., "Particle swarm optimization," Presented at Proceedings of ICNN'95—international conference on neural networks, Perth, Australia, Nov. 27-Dec. 1, 1995, pp. 1942-1948.
Krause et al., "Contextual Gaussian Process Bandit Optimization," Presented at Advances in Neural Information Processing Systems, Granada, Spain, Dec. 12-14, 2011; Advances in Neural Information Processing Systems 24, Dec. 2011, 9 pages.
Kudo et al., "SentencePiece: A simple and language independent subword tokenizer and detokenizer for neural text processing," Presented at Proceedings of the 2018 Conference on Empirical Methods in Natural Language Processing: System Demonstrations, Brussels, Belgium, Oct. 31-Nov. 4, 2018, pp. 66-71.
Kumar et al., "Conservative Q-Learning for Offline Reinforcement Learning," Presented at the Advances in Neural Information Processing Systems, Vancouver, Canada, Dec. 6-12, 2020; Advances in Neural Information Processing Systems 33, Dec. 2020, 13 pages.
Lample et al., "Deep learning for symbolic mathematics," Presented at International Conference on Learning Representations, Addis Ababa, Ethopia, Apr. 26-30, 2020, 24 pages.
Levine et al., "Offline reinforcement learning: Tutorial, review, and perspectives on open problems," CoRR, Submitted on Nov. 1, 2020, arXiv:2005.01643v3, 43 pages.
Li et al., "Competition-level code generation with alphacode," CoRR, Submitted on Feb. 8, 2022, arXiv:2203.07814v1, 74 pages.
Liaw et al., "Tune: A research platform for distributed model selection and training," CoRR, Submitted on Jul. 13, 2018, arXiv:1807.05118v1, 8 pages.
Muller et al, "Transfomers can do bayesian inference," CoRR, Submitted on Feb. 23, 2022, arXiv:2112.10510v4, 23 pages.
Naeini et al., "Obtaining well calibrated probabilities using bayesian binning," Presented at Twenty-Ninth AAAI Conference on Artificial Intelligence, Austin TX, Jan. 25-30, 2015, 2901-2907.
Nambiar et al., "Transforming the language of life: Transformer neural networks for protein prediction tasks," Presented at Proceedings of the 11th ACM international conference on bioinformatics, computational biology and health informatics, Virtual Conference, Sep. 21-24, 2020, 1-8.
Peng et al., "Pyglove: Symbolic programming for automated machine learning," Presented at the Advances in Neural Information Processing Systems, Vancouver, Canada, Dec. 6-12, 2020; Advances in Neural Information Processing Systems 33, Dec. 2020, 13 pages.
Perrone et al., "Amazon SageMaker Automatic Model Tuning: Scalable Black-box Optimization," CoRR, Submitted on Dec. 15, 2020, arXiv:2012.08489v1, 13 pages.
Perrone et al., "Scalable hyperparameter transfer learning," Presented at Advances in Neural Information Processing Systems, Montreal, Canada, Dec. 3-8, 2018; Advances in Neural Information Processing Systems 31, Dec. 2018, 11 pages.
Pineda Arango et al., "HPO-B: A large-scale reproductible benchmark for black-box HPO based on openML," CoRR, Submitted on Oct. 11, 2021, arXiv:2106.06257v2, 31 pages.
Poloczek et al., "Multi-information source optimization," Presented at Advances in Neural Information Processing Systems, Long Beach, CA, Dec. 4-9, 2017; Advances in Neural Information Processing Systems 30, Dec. 2017, 11 pages.
Poloczek et al., "Warm starting bayesian optimization," Presented at Proceedings of the 2016 Winter Simulation Conference, Arlington VA, Dec. 11-14, 2016, pp. 770-781.
Raffel et al., "Exploring the limits of transfer learning with a unified text-to-text transformer," Journal of Machine Learning Research, Jun. 2020, 21(140):1-67.
Real et al., "Regularized evolution for image classifier architecture search," Presented at Proceedings of the Thirty-Third AAAI Con-

(56) References Cited

OTHER PUBLICATIONS ference on Artificial Intelligence and Thirty-First Innovative Applications of Artificial Intelligence Conference and Ninth AAAI Symposium on Educational Advances in Artificial Intelligence, Honolulu, HI, Jan. 27-Feb. 1, 2019, 4780-4789.
Reed et al., "A generalist agent," CoRR, Submitted on Nov. 11, 2022, arXiv:2205.06175v3, 42 pages.
Rives et al., "Biological structure and function 390 emerge from scaling unsupervised learning to 250 million protein sequences," Proceedings of the National Academy of Sciences, Apr. 5, 2021, 118(15):e2016239118, 24 Pages.
Rosenblatt, "Remarks on a multivariate transformation," The Annals of Mathematical Statistics, Sep. 1952, 23(3):470-472.
Rothfuss et al., "PACOH: Bayes-Optimal Meta-Learning with PAC-Guarantees," Presented at Proceedings of the 38th International Conference on Machine Learning, Virtual Conference, Jul. 18-24, 2021, 11 pages.
Schmidhuber, "Reinforcement learning upside down: Don't predict rewards—just map them to actions," CoRR, Submitted on Dec. 5, 2019, arXiv:1912.02875v1, 20 pages.
Schrittwieser et al., "Online and offline reinforcement learning by planning with a learned model," Presented at Advances in Neural Information Processing Systems, Virtual Conference, Dec. 6-14, 2021; Advances in Neural Information Processing Systems 34, Dec. 2021, 12 pages.
Singh et al., "Privileged zero-shot automl," CoRR, Submitted on Jun. 25, 2021, arXiv:2106.13743v1, 16 pages.
Swersky et al., "Multi-task bayesian optimization," Presented at Advances in Neural Information Processing Systems, Lake Tahoe, Nevada, Dec. 5-8, 2013; Advances in Neural Information Processing Systems 26, Dec. 2013, 9 pages.
Turner et al., "Bayesian optimization is superior to random search for machine learning hyperparameter tuning: Analysis of the black-box optimization challenge 2020," Proceedings of Machine Learning Research, virtual conference, Jul. 18-24, 2021, pp. 3-26.
Valipour et al., "SymbolicGPT: A generative transformer model for symbolic regression," CoRR, Submitted on Jun. 27, 2021, arXiv:2106.14131v1, 11 pages.
Vanschoren et al., "OpenML: networked science in machine learning," ACM SIGKDD Explorations Newsletter, Jun. 16, 2014, 15(2):49-60.
Vaswani et al., "Attention is all you need," Presented at Advances in Neural Information Processing Systems, Long Beach, CA, Dec. 4-9, 2017; Advances in Neural Information Processing Systems 30, Dec. 2017, 11 pages.
Volpp et al., "Meta-learning acquisition functions for transfer learning in bayesian optimization," International Conference on Learning Representations, Virtual Conference, Apr. 26-May 1, 2020, 22 pages.
Wang et al., "Learning to reinforcement learn," CoRR, Submitted on Jan. 23, 2017, arXiv:1611.05763v3, 17 pages.
Wang et al., "Pre-training helps bayesian optimization too," CoRR, Submitted Jul. 7, 2022, arXiv:2109.08215v4, 35 pages.
Wang et al., "Regret bounds for meta Bayesian optimization with an unknown gaussian process prior," Presented at Advances in Neural Information Processing Systems, Montreal, Canada, Dec. 3-8, 2018; Advances in Neural Information Processing Systems 31, Dec. 2018, 12 pages.
Wistuba et al., "Few-shot bayesian optimization with deep kernel surrogates," Presented at International Conference on Learning Representations, Virtual Conference, May 3-7, 2021, 15 pages.
Yang et al., "Eagle strategy using Lévy walk and firefly algorithms for stochastic optimization," Nature Inspired Cooperative Strategies for Optimization (NICSO 2010), 2010, pp. 101-111.
Yogatama et al., "Efficient transfer learning method for automatic hyperparameter tuning," Presented at Proceedings of the Seventeenth International Conference on Artificial Intelligence and Statistics, Reykjavik, Iceland, Apr. 22-25, 2014, 1077-1085.
Zheng et al., "Online decision transformer," CoRR, Submitted on Jul. 13, 2022, arXiv:2202.05607v2, 18 pages.

* cited by examiner

DETERMINING HYPERPARAMETERS USING SEQUENCE GENERATION NEURAL NETWORKS

CROSS-REFERENCE TO RELATED APPLICATION

This application claims priority to U.S. Provisional Application No. 63/344,032 May 19, 2022. The disclosure of the prior application is considered part of and is incorporated by reference in the disclosure of this application.

BACKGROUND

This specification relates to training machine learning models, e.g., neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a system that determines optimized hyperparameters for training a neural network to perform a machine learning task.

Particular embodiments of the subject matter described in this specification can be implemented so as to realize one or more of the following advantages.

Using the described techniques, the same sequence generation neural network can be used to guide a hyperparameter search for multiple different machine learning tasks and multiple different sets of hyperparameters. In particular, by representing the results of trials that have already been conducted as a sequence of tokens, the system can effectively leverage the modeling capacity of language models, e.g., causal Transformers, to accurately predict hyperparameter settings for hyperparameter trials. Moreover, by including a metadata sequence in the input sequence of the language model, the system can allow the sequence generation neural network to be trained on training data from multiple different hyperparameter prediction tasks, e.g., with different numbers of hyperparameters that need to be predicted and different types of hyperparameters that need to be predicted, and, as a result, to, after training, generalize to tasks outside of those seen in the training data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
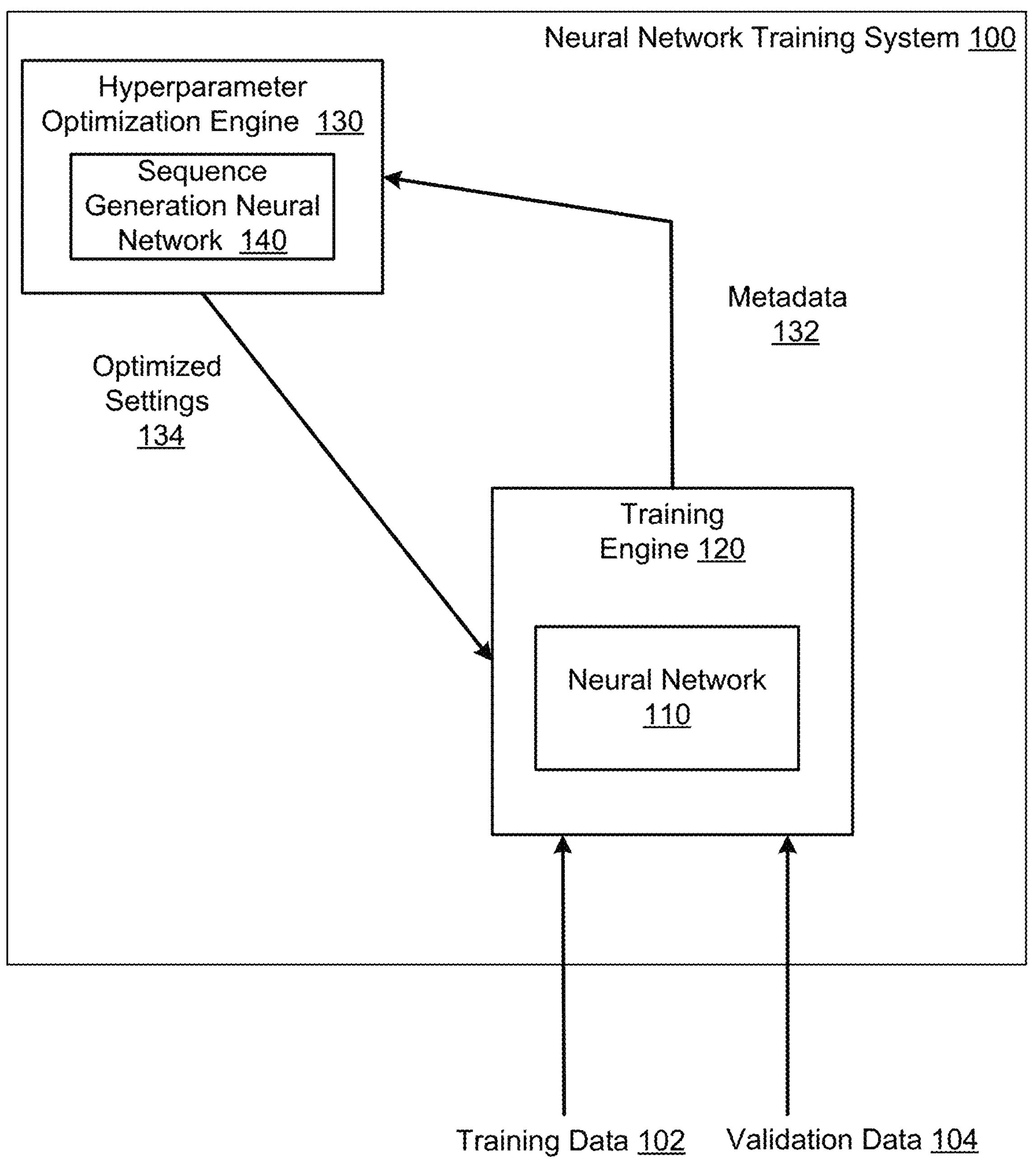
FIG. 1 shows an example neural network training system.

This specification generally describes a system that determines optimized hyperparameters for training a machine learning model to perform a machine learning task.

While the remainder of the specification will refer to the model being trained as a neural network, the model can in practice be any appropriate model that is trained through a training process that has hyperparameters. Examples of such models include, in addition to neural networks, decision trees, random forests, support vector machines (SVMs), generalized linear models, and so on. That is, the described techniques can be used to determine the hyperparameters for the training of any appropriate type of machine learning model, not just a neural network.

The neural network can be trained to perform any kind of machine learning task, i.e., can be configured to receive any kind of digital data input and to generate any kind of score, classification, or regression output based on the input.

In some cases, the neural network is a neural network that is configured to perform an image processing task, i.e., receive an input image and to process the intensity values of the pixels of the input image to generate a network output for the input image. For example, the task may be image classification and the output generated by the neural network for a given image may be scores for each of a set of object categories, with each score representing an estimated likelihood that the image contains an image of an object belonging to the category. As another example, the task can be image embedding generation and the output generated by the neural network can be a numeric embedding of the input image. As yet another example, the task can be object detection and the output generated by the neural network can identify locations in the input image at which particular types of objects are depicted. As yet another example, the task can be image segmentation and the output generated by the neural network can assign each pixel of the input image to a category from a set of categories.

As another example, if the inputs to the neural network are Internet resources (e.g., web pages), documents, or portions of documents or features extracted from Internet resources, documents, or portions of documents, the task can be to classify the resource or document, i.e., the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, the task may be an audio processing task. For example, if the input to the neural network is a sequence representing a spoken utterance, the output generated by the neural network may be a score for each of a set of pieces of text, each score representing an estimated likelihood that the piece of text is the correct transcript for the utterance. As another example, the task may be a keyword spotting task where, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram or other data defining audio of the text being spoken in the natural language.

As another example, the task can be a health prediction task, where the input is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be an agent control task, where the input is an observation characterizing the state of an environment and the output defines an action to be performed by the agent in response to the observation. The agent can be, e.g., a real-world or simulated robot, a control system for an industrial facility, or a control system that controls a different kind of agent.

FIG. 1 shows an example neural network training system 100. The neural network training system 100 is an example of a system implemented as computer programs on one or more computers in one or more locations, in which the systems, components, and techniques described below can be implemented.

The neural network training system 100 is a system that obtains training data 102 for training a neural network 110 to perform a particular task and a validation set 104 for evaluating the performance of the neural network 110 on the particular task and uses the training data 102 and the validation set 104 to train the neural network 110.

Generally, the training data 102 and the validation set 104 both include a set of neural network inputs and, for each network input, a respective target output that should be generated by the neural network to perform the particular task. For example, a larger set of training data may have been randomly partitioned to generate the training data 102 and the validation set 104. In some cases, e.g., when the system is training the neural network 110 using a semi-supervised learning scheme, the training data 120 may include additional network inputs for which no target output is available.

The system 100 can receive the training data 102 and the validation set 104 in any of a variety of ways. For example, the system 100 can receive training data as an upload from a remote user of the system over a data communication network, e.g., using an application programming interface (API) made available by the system 100, and randomly divide the uploaded data into the training data 102 and the validation set 104. As another example, the system 100 can receive an input from a user specifying which data that is already maintained by the system 100 should be used for training the neural network, and then divide the specified data into the training data 102 and the validation set 104.

The neural network 110 is a neural network having a set of parameters ("trainee parameters") and that is configured to process network inputs in accordance with the trainee parameters to generate an output for the particular task. The neural network 110 can have any appropriate architecture that allows the neural network 110 to receive network inputs of the type required by the particular task and to generate network outputs of the form required for the particular task. Examples of neural networks 110 that can be trained by the system 100 include fully-connected neural networks, convolutional neural networks, recurrent neural networks, attention-based neural networks, e.g., Transformers, and so on.

Generally, a training engine 120 within the system 100 trains the neural network 110 on the training data 102 in accordance with a set of hyperparameters for the training.

The set of hyperparameters can include any of a variety of values that are not learned during the training process but that can impact the performance of the trained neural network, the efficiency of the training process, or both.

For example, hyperparameters can include any of:

an optimizer that is used for the training
a learning rate that is used for the training
a weight decay factor that is used for the training
a batch size that is used for the training
a depth of the neural network that is being trained
respective weights assigned to one or more of the terms in the loss function that is used for the training
and so on Prior to training the neural network 110, a hyperparameter optimization engine 130 within the system 100 determines optimized settings 134 for at least a subset of the set of hyperparameters for the training. That is, in some cases the hyperparameter optimization engine 130 within the system 100 determines optimized settings for all of the hyperparameters for the training while, in other cases, the hyperparameter optimization engine 130 determines optimized settings for only a subset of the hyperparameters for the training, with the remaining values being fixed to values determined using a different hyperparameter initialization technique, e.g., random search or grid search.

Once the hyperparameter optimization engine 130 within the system 100 determines the optimized settings, the training engine 120 trains the neural network 110 on the training data 102 in accordance with the optimized settings (also referred to as optimized "values") 134 of the hyperparameters.

For example, the training engine 120 can train the neural network 110 to optimize an objective function using an optimizer.

The objective function can be any appropriate objection function for the particular task. Examples of objective functions include cross-entropy losses, mean squared error losses, L2 distance losses, log likelihood objectives, and so on.

In particular, the engine 130 receives metadata 132 specifying (i) the machine learning task and (ii) a set of hyperparameters for training the neural network 110 to perform the machine learning task.

The engine 130 then uses the metadata 132 to generate one or more inputs to a sequence generation neural network 140 and uses the outputs of the sequence generation neural network 140 to generate the optimized values 134 of the hyperparameters.

As will be evident from the description below, the engine 130 can determine optimized values for multiple (i) different sets of hyperparameters, (ii) different machine learning tasks, (iii) different network architectures, or some of combination of the above. That is, the system can use the same sequence generation neural network 140 to generate optimized values for different sets of hyperparameters for training different neural networks to perform different tasks without needing to retrain the sequence generation neural network 140.

The sequence generation neural network 140 can be an auto-regressive neural network that auto-regressively generates an output sequence of tokens by generating each particular token in the output sequence conditioned on a current input sequence that includes (i) an input sequence of input tokens followed by (ii) any tokens that precede the particular token in the output sequence.

More specifically, to generate a particular token, the neural network 140 can process the current input sequence to generate a score distribution, e.g., a probability distribution, that assigns a respective score, e.g., a respective probability, to each token in a vocabulary of tokens. For example, the vocabulary of tokens can include text symbols, e.g., words, characters, word pieces, and so on, numbers, e.g., integers, punctuation marks, and optionally other alphanumeric symbols.

The neural network 140 can then select, as the particular token, a token from the vocabulary using the score distribution. For example, the neural network 140 can greedily select the highest-scoring token or can sample, e.g., using nucleus sampling or another sampling technique, a token from the distribution.

As a particular example, the neural network 140 can be an auto-regressive Transformer-based neural network that includes a plurality of layers that each apply a self-attention operation. The neural network 140 can have any of a variety of Transformer-based neural network architectures. Examples of such architectures include those described in Colin Raffel, Noam Shazeer, Adam Roberts, Katherine Lee, Sharan Narang, Michael Matena, Yanqi Zhou, Wei Li, and Peter J Liu. Exploring the limits of transfer learning with a unified text-to-text transformer. arXiv preprint arXiv: 1910.10683, 2019; Daniel Adiwardana, Minh-Thang Luong, David R. So, Jamie Hall, Noah Fiedel, Romal Thoppilan, Zi Yang, Apoory Kulshreshtha, Gaurav Nemade, Yifeng Lu, and Quoc V. Le. Towards a human-like open-domain chatbot. CoRR, abs/2001.09977, 2020; and Tom B Brown, Benjamin Mann, Nick Ryder, Melanie Subbiah, Jared Kaplan, Prafulla Dhariwal, Arvind Neelakantan, Pranav Shyam, Girish Sastry, Amanda Askell, et al. Language models are few-shot learners. arXiv preprint arXiv: 2005.14165, 2020.

As a specific example, the neural network 140 can be a causal Transformer neural network, i.e., a decoder-only Transformer neural network that applies causally masked self-attention over the current input sequence to generate the probability distribution over the vocabulary tokens or an encoder-decoder Transformer that has a self-attention encoder that encodes the input sequence and a causal Transformer decoder that applies causally masked self-attention over the elements of the already generated output sequence and cross-attention into the encoded representation of the input sequence.

Generally, because the neural network 140 is auto-regressive, the engine 130 can use the same neural network 140 to generate multiple different candidate output sequences in response to a given input sequence, e.g., by using beam search decoding from score distributions generated by the neural network 140, using a Sample-and-Rank decoding strategy, by using different random seeds for the pseudo-random number generator this is used in sampling for different runs through the neural network 140 or using another decoding strategy that leverages the auto-regressive nature of the neural network 140.

Generating optimizer hyperparameters using the neural network 140 will be described in more detail below.

In some implementations, after the neural network 110 has been trained, the system 100 deploys the trained neural network and then uses the trained neural network to process requests received from users, e.g., through the API provided by the system. In other words, after training, the system uses the trained neural network 110 to generate new network outputs for new network inputs.

Instead of or in addition to using the trained neural network 110, the system 100 can provide data specifying the final trained parameter values to a user who submitted a request to train the neural network, e.g., through the API.

Figure 2:
FIG. 2 is a flow diagram of an example process for determining hyperparameter values.
Figure 2:
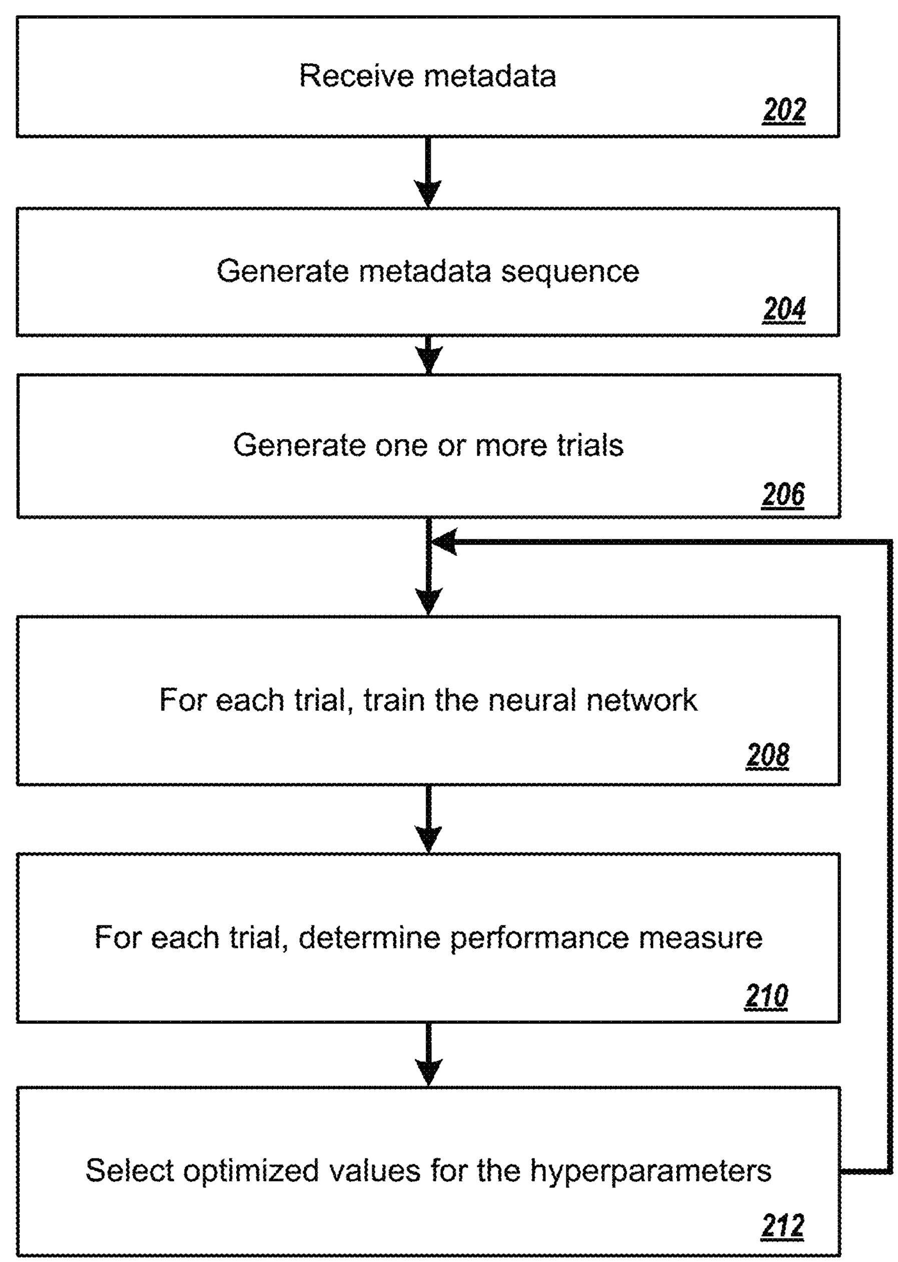

FIG. 2 is a flow diagram of an example process 200 for determining optimized settings for hyperparameters. For convenience, the process 200 will be described as being performed by a system of one or more computers located in one or more locations. For example, a neural network training system, e.g., the neural network training system 100 of FIG. 1, appropriately programmed, can perform the process 200.

The system receives metadata specifying (i) a machine learning task and (ii) a set of hyperparameters for training a neural network to perform the machine learning task (step 202).

The system generates a metadata sequence that represents the metadata as a sequence of tokens from a vocabulary of tokens (step 204).

The system then determines a respective optimized value for each of the hyperparameters in the set across multiple iterations.

At each of the plurality of iterations, the system generates one or more trials that each specify a respective value for each of the hyperparameters in the set (step 206).

For each trial, the system trains the neural network on a set of training data for the machine learning task with the set of hyperparameters having the respective values specified by the trial (step 208) and determines a performance measure for the trial based on the performance of the trained neural network (and optionally on the efficiency of the training process) (step 210).

For example, the measure of performance can measure the accuracy of the trained neural network, e.g., on a validation or other held-out set.

As another example, the measure of performance can also measure the efficiency of the training process of training the neural network. For example, the performance measure can be a sum or a weighted sum of an accuracy term that depends on the accuracy of the trained neural network and an efficiency term that depends on the efficiency of the training process, e.g., the FLOPs consumed by the training, the energy, e.g., in terms of electrical power, consumed by the training process, and so on.

To generate each trial, the system uses the sequence generation neural network to process an input sequence for the trial to generate an output sequence for the trial that represents respective values for the hyperparameters in the set as tokens from the vocabulary of tokens.

More specifically, the input sequence for the trial is made up of at least an input sequence for the iteration that includes (i) the metadata sequence and (ii) for any earlier trials performed at any preceding iterations, a respective sequence that represents the respective values for the hyperparameters specified by the earlier trial and a measure of performance for the trial as a sequence of tokens from the vocabulary of tokens. That is, the input sequence represents both the metadata sequence and the hyperparameters that have already been evaluated and the corresponding performance measures.

Input sequences are described in more detail below with reference to FIG. 3.

The system then selects, as the respective optimized values for the hyperparameters, the respective values specified by one of the trials generated at one of the plurality of iterations based on the performance measures for the trials (step 212), e.g., by selecting the values from the trial with the highest performance measure.

In some implementations, each iteration includes multiple trials. In these implementations, the system can perform the training for each of the trials in parallel on parallel processing hardware, e.g., by assigning the operations for executing each training procedure to a respective different device, a respective different thread of a device, or a respective different core of a multi-core processor. As a particular example, the system can distribute the training across multiple GPUs, TPUs, or both.

That is, even though the sequence generation neural network generates hyperparameter setting sequentially, i.e., conditioned on each earlier trial and the results of each trial, the system can employ "masking" of the performance measures to generate multiple trials to be executed in parallel at each training iteration, adapting the described hyperparameter search technique to be parallelized on parallel processing hardware.

To perform masking, the system can generate the multiple trials according to a trial order, i.e., one after the other. However, because the trials are being performed in parallel, when generating any given trial, the system does not have the performance measures of the earlier trials available for inclusion in the input sequence.

Instead, for any given trial, the system generates a trial input sequence for the given trial that includes the input sequence for the iteration followed by, for any trials for the iteration that are earlier than the given trial in the trial order, a respective sequence that represents the respective values for the hyperparameters specified by the trial and a masked out value for a measure of performance for the trial as a sequence of tokens from the vocabulary of tokens.

In some cases, the masked out value is a predetermined placeholder value.

In some other cases, the masked out value is predicted by the sequence generation neural network. That is, rather than using the sequence generation neural network to predict hyperparameter setting, the system can cause the sequence generation neural network to predict a performance value for a particular trial by processing a trial input sequence that includes (i) the input sequence for the iteration followed by (ii) for any trials for the iteration that are earlier than the particular trial in the trial order, a respective sequence that represents the respective values for the hyperparameters specified by the trial and a masked out value for a measure of performance for the trial as a sequence of tokens from the vocabulary of tokens, and (iii) a sequence for the particular trial that represents the respective values for the hyperparameters specified by the particular trial as a sequence of tokens from the vocabulary of tokens without specifying a value for a measure of performance for the particular trial.

More specifically, because the system represents the input to the sequence generation neural network as a sequence of tokens and because the sequence generation neural network predicts next tokens auto-regressively, the sequence generation neural network can be trained to predict both hyperparameter values (given past history of trials) and measures of performance for a trial (given past history and the hyperparameter values for the trial) as part of the same training process, i.e., using gradients of the same loss function evaluated on the same training examples and with no additional training overhead. Thus, after training, the sequence generation neural network can effectively predict both hyperparameter values and measures of performance.

Figure 3:
FIG. 3 shows the operation of the sequence generation neural network.
Figure 3:
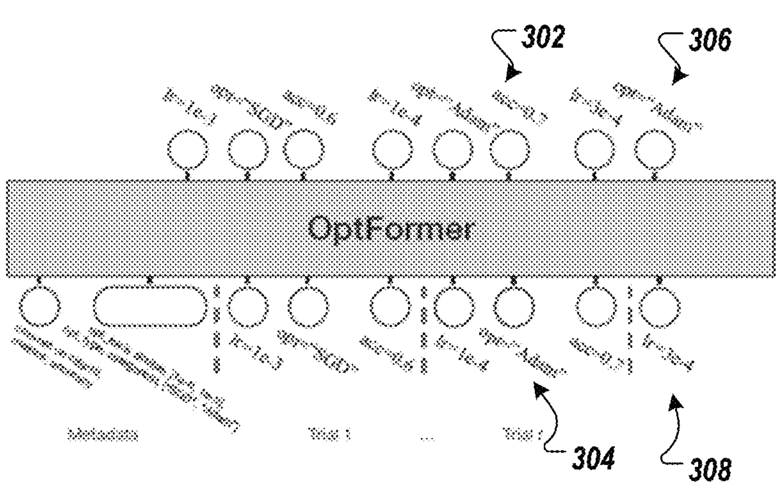

FIG. 3 shows an example 300 of the operation of the sequence generation neural network 140 (referred to as the "OptFormer" in the Figure).

In the example of FIG. 3, the sequence generation neural network 140 is being used to predict values for two hyperparameters: the optimizer being used for the training and the value of the learning rate used for the training.

In particular, the example of FIG. 3 shows the processing of an input sequence for a trial t+1.

As shown in FIG. 3, the input sequence includes (i) tokens representing the metadata for the training and (ii) tokens characterizing the results of previous trials, i.e., trials 1 through t.

As a particular example, the neural network 140 can be an encoder-decoder Transformer neural network, with the encoder neural network processing the tokens representing the metadata to generate an encoded representation of the metadata tokens and the decoder neural network processing the tokens characterizing the results of the previous trials using cross-attention and causally-masked self-attention.

The tokens representing the metadata for the training include one or more tokens characterizing the neural network being trained ("convnet"), the data set that is being trained on ("cifar10") and the metric being used to measure the performance of the neural network ("accuracy").

The tokens also include one or more tokens characterizing the set of hyperparameters, e.g., the learning rate employed by the optimizer ("opt_kw.1r") that is represented as "double" variable and has possible values in the range of [1e-6, 1e-2] and the optimizer type ("opt_type") that is represented as a "categorical" variable and has possible values ["SGD" and "Adam"].

The tokens representing each previous trial include the values of the hyperparameters of the trial and the performance measure (accuracy, i.e., "acc") for the trial.

Because the neural network 140 is auto-regressive, by processing any given subset of the input sequence, the neural network 140 can predict the token that follows the last token in the input sequence. Thus, as described above, the neural network 140 can be used to predict both the performance measures and hyperparameter values.

For example, to predict the token 302 representing the performance measure for trial t, the system can process an input sequence that ends with the token 304 representing the value of the last hyperparameter in the trial.

As another example, to predict the token 306 represent the value of the optimizer for the trial t+1, the system can process an input sequence that ends with the token 308 representing the value of the learning rate for the trial.

In order to generate the input sequence, the system needs to represent the metadata and the results from previous trials as tokens from the vocabulary.

This can be done in any of a variety of ways.

One specific example of tokenizing metadata and trial results follows.

For example, the system can receive textual representation of the metadata and then compress the textual representation of the metadata by removing redundant phrases and punctuation (e.g., "parameter", quotes) and encoding keywords (e.g., "name", "algorithm") and enumerating types (e.g., "DOUBLE") into single tokens.

For the trial results, the system converts every DOUBLE and INTEGER hyperparameter along with every function value (performance measure) into a single token, by normalizing and discretizing them into integers. For other types, the system uses the index in the hyperparmeter's value set to generate the token representing the hyperparameter value. The system can then convert the shortened text string into to a sequence of tokens via a tokenizer, e.g., the SentencePiece tokenizer.

Thus, every trial is represented by text, which is represented as a sequence of normalized and quantized tokens, optionally with designated separator tokens (e.g., "?" "|" and so on) that separate hyperparameter and function values and trials.

The system can then reverse the tokenization procedure in order to map predicted tokens into performance measures or hyperparameter values.

Prior to using the sequence generation neural network, the system 100 trains the sequence generation neural network on training data.

In particular, the system obtains training data that includes multiple sequences that represent iterations of hyperparameter evaluation as performed by another system, e.g., using a heuristic-based hyperparameter search technique, e.g., random search or grid search.

The training data can include sequences that represent multiple different hyperparameter prediction tasks, e.g., with different numbers of hyperparameters that need to be predicted and different types of hyperparameters that need to be predicted, different architectures of neural networks being trained, and different machine learning tasks. In particular, because each input sequence includes the metadata tokens that describe the hyperparameter prediction task, the sequence generation neural network 140 can be effectively trained on all of these different training sequences.

The training system then trains the sequence generation neural network 140 on the training sequences.

For example, the system can train the neural network on the training sequences using supervised learning.

As a particular example, the system can optimize a weighted log-likelihood loss that assigns zero weights to separator tokens and positive weights to all of other tokens in the training sequences.

As another example, the system can train the neural network on the training sequences using reinforcement learning, e.g., offline reinforcement learning.

During the training, by enforcing losses on the predictions made by the neural network for both hyperparameter values and performance measures, the system can ensure that at inference the system can accurately predict both the hyperparameter values and the corresponding performance measures.

In some implementations, rather than directly use the predicted values generated by the sequence generation neural network to select hyperparameter values for evaluation, the system can use the sequence generation neural network to guide a planning process in order to select the hyperparameter values to be evaluated.

Figure 4:
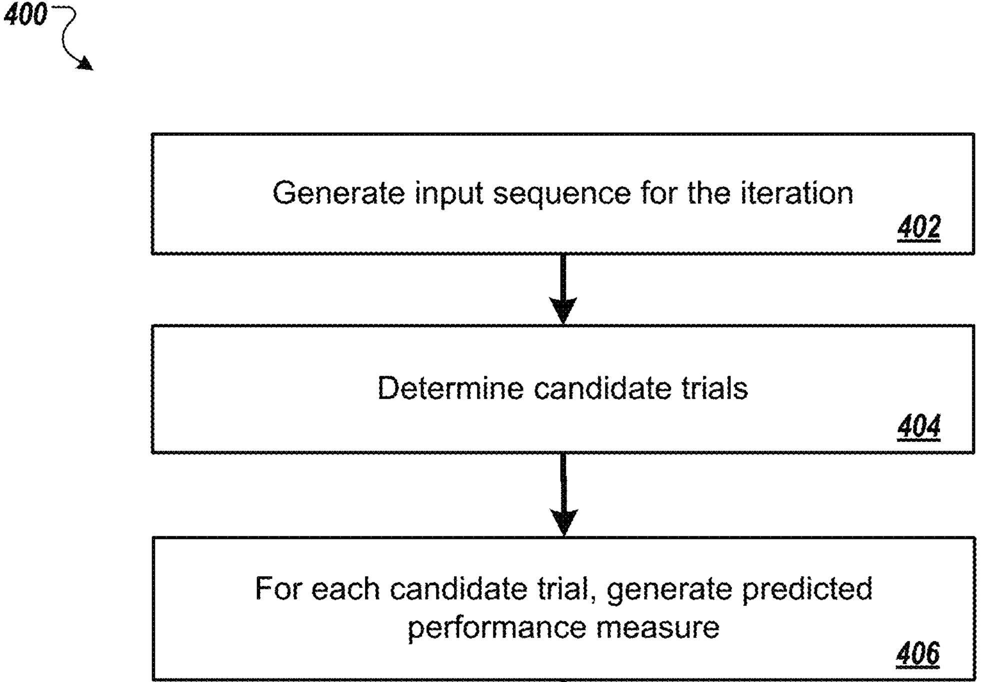
FIG. 4 is a flow diagram of an example process for performing a planning process.

FIG. 4 is a flow diagram of an example process 400 for performing planning using the sequence generation neural network. For convenience, the process 400 will be described as being performed by a system of one or more computers located in one or more locations. For example, a neural network training system, e.g., the neural network training system 100 of FIG. 1, appropriately programmed, can perform the process 400.

In particular, the process 400 describes performing an iteration that includes one more trials when the planning process is incorporated.

In particular, to generate each trial during the iteration, the system generates an input sequence for the iteration that includes (i) the metadata sequence and (ii) for any earlier trials performed at any preceding iterations, a respective sequence that represents the respective values for the hyperparameters specified by the earlier trial and a measure of performance for the trial as a sequence of tokens from the vocabulary of tokens (step 402).

The system then determines a plurality of candidate trials that each specify a different combination of respective values for the hyperparameters in the set (step 404).

For example, the system can enumerate each possible combination of respective values or, when the number of possible combinations is too large, can randomly sample a maximum number of possible combinations.

Alternatively, when the number of possible combinations is too large, the system can sample the plurality of candidate trials comprises from outputs generated by the sequence generation neural network by processing the input sequence for the iteration. That is, the system can auto-regressively generate each candidate trial by sampling each token that defines the candidate trial from probability distributions generated by the sequence generation neural network as described above.

As yet another example, the system can sample the plurality of candidate trials using a prior policy. For example, the prior policy can be a random policy, an already trained neural network, or a different hyperparameter selection policy.

For each of the candidate trials, the system processes an input sequence for the candidate trial that includes (i) the input sequence for the iteration and (ii) a sequence that represents the respective values for the hyperparameters that are specified by the candidate trial using the sequence generation neural network to generate an output that represents a predicted performance measure for the candidate (step 406). That is, as described above, the system can use the sequence generation neural network to predict performance measures for trials that have not yet been carried out.

The system selects, as the hyperparameter values specified by the trial, the hyperparameter values specified by one of the candidate trials based on the predicted performance measures (step 408).

For example, the system can apply an acquisition function to each of the predicted performance measures to generate a respective acquisition score for each candidate trial and then selecting one of the candidate trials based on the respective acquisition scores, e.g., by selecting the candidate trial with the highest score.

The system can use any of a variety of acquisition functions to generate the acquisition scores. Examples of such functions include e Expected Improvement (EI), Probability of Improvement (PI), Upper Confidence Bound (UCB), and Thompson Sampling.

The system can then proceed as described above with reference to FIG. 2 to carry out the one or more trials for the iteration.

Thus, rather than directly select hyperparameter values generated using the sequence generation neural network, the system uses the sequence generation neural network to "plan" by using outputs of the neural network select between multiple candidate trials which can, in some cases, also be proposed by the neural network. Doing so can result in improved performance without any significant overhead during the hyperparameter search process, i.e., because no additional training of the neural network 110 is required.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a Jax framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

receiving metadata specifying (i) a machine learning task and (ii) a set of hyperparameters for training a machine learning model to perform the machine learning task;

generating a metadata sequence that represents the metadata as a sequence of tokens from a vocabulary of tokens; and determining a respective optimized value for each of the hyperparameters in the set, comprising:

at each of a plurality of iterations:

generating one or more trials that each specify a respective value for each of the hyperparameters in the set, comprising, for each trial:

generating an input sequence for the iteration that comprises (i) the metadata sequence and (ii) for any earlier trials performed at any preceding iterations, a respective sequence that represents the respective values for the hyperparameters specified by the earlier trial and a measure of performance for the trial as a sequence of tokens from the vocabulary of tokens, and processing an input sequence for the trial that comprises the input sequence for the iteration using a sequence generation neural network to generate an output sequence for the trial that represents respective values for the hyperparameters in the set as tokens from the vocabulary of tokens; and for each trial, training the machine learning model on a set of training data for the machine learning task with the set of hyperparameters having the respective values specified by the trial and determining a performance measure for the trial based on a performance of the trained machine learning model; and selecting, as the respective optimized values for the hyperparameters, the respective values specified by one of the trials generated at one of the plurality of iterations based on the performance measures for the trials.

2. The method of claim 1, further comprising:

training the machine learning model on training data for the machine learning task with each hyperparameter in the set being set to the respective optimized value for the hyperparameter.

3. The method of claim 2, further comprising:

after training the machine learning model on training data for the machine learning task with each hyperparameter in the set being set to the respective optimized value for the hyperparameter:

receiving a new input for the machine learning task; and processing the new input for the machine learning task using the trained machine learning model to generate a new output for the machine learning task for the new input.

4. The method of claim 1, wherein the sequence generation neural network is a causal Transformer.

5. The method of claim 1, wherein each iteration has multiple trials and wherein the training for each of the multiple trials is performed in parallel on parallel processing hardware.

6. The method of claim 5, wherein, for each iteration, the multiple trials are ordered according to a trial order, and wherein the trial input sequence for each given trial includes the input sequence for the iteration followed by, for any trials for the iteration that are earlier than the given trial in the trial order, a respective sequence that represents the respective values for the hyperparameters specified by the trial and a masked out value for a measure of performance for the trial as a sequence of tokens from the vocabulary of tokens.

7. The method of claim 6, wherein the masked out value is a predetermined placeholder value.

8. The method of claim 6, wherein the masked out value for a particular trial is a value predicted by the sequence generation neural network by processing a trial input sequence that includes (i) the input sequence for the iteration followed by (ii) for any trials for the iteration that are earlier than the particular trial in the trial order, a respective sequence that represents the respective values for the hyperparameters specified by the trial and a masked out value for a measure of performance for the trial as a sequence of tokens from the vocabulary of tokens, and (iii) a sequence for the particular trial that represents the respective values for the hyperparameters specified by the particular trial as a sequence of tokens from the vocabulary of tokens without specifying a value for a measure of performance for the particular trial.

9. The method of claim 1, wherein the sequence generation neural network has been trained through supervised learning.

10. The method of claim 1, wherein the sequence generation neural network has been trained through reinforcement learning.

11. A method performed by one or more computers, the method comprising:

receiving metadata specifying (i) a machine learning task and (ii) a set of hyperparameters for training a machine learning model to perform the machine learning task;

generating a metadata sequence that represents the metadata as a sequence of tokens from a vocabulary of tokens; and determining a respective optimized value for each of the hyperparameters in the set, comprising:

at each of a plurality of iterations:

generating one or more trials that each specify a respective value for each of the hyperparameters in the set, comprising, for each trial:

generating an input sequence for the iteration that comprises (i) the metadata sequence and (ii) for any earlier trials performed at any preceding iterations, a respective sequence that represents the respective values for the hyperparameters specified by the earlier trial and a measure of performance for the trial as a sequence of tokens from the vocabulary of tokens, determining a plurality of candidate trials that each specify a different combination of respective values for the hyperparameters in the set;

for each of the candidate trials, processing an input sequence for the candidate trial that comprises (i) the input sequence for the iteration and (ii) a sequence that represents the respective values for the hyperparameters that are specified by the candidate trial using a sequence generation neural network to generate an output that represents a predicted performance measure for the candidate trial; and selecting, as the hyperparameter values specified by the trial, the hyperparameter values specified by one of the candidate trials based on the predicted performance measures;

for each trial, training the machine learning model on a set of training data for the machine learning task with the set of hyperparameters having the respective values specified by the trial and determining a performance measure for the trial based on a performance of the trained machine learning model; and selecting, as the respective optimized values for the hyperparameters, the respective values specified by one of the trials generated at one of the plurality of iterations based on the performance measures for the trials.

12. The method of claim 11, further comprising:

training the machine learning model on training data for the machine learning task with each hyperparameter in the set being set to the respective optimized value for the hyperparameter.

13. The method of claim 12, further comprising:

after training the machine learning model on training data for the machine learning task with each hyperparameter in the set being set to the respective optimized value for the hyperparameter:

receiving a new input for the machine learning task; and processing the new input for the machine learning task using the trained machine learning model to generate a new output for the machine learning task for the new input.

14. The method of claim 11, wherein the sequence generation neural network is a causal Transformer.

15. The method of claim 11, wherein each iteration has multiple trials and wherein the training for each of the multiple trials is performed in parallel on parallel processing hardware.

16. The method of claim 11, wherein determining the plurality of candidate trials comprises sampling the candidate trials from outputs generated by the sequence generation neural network by processing the input sequence for the iteration.

17. The method of claim 11, wherein determining the plurality of candidate trials comprises sampling the candidate trials using a prior policy.

18. The method of claim 11, wherein selecting, as the hyperparameter values specified by the trial, the hyperparameter values specified by one of the candidate trials based on the predicted performance measures comprises:

applying an acquisition function to each of the predicted performance measures to generate a respective acquisition score for each candidate trial; and selecting one of the candidate trials based on the respective acquisition scores.

19. The method of claim 11, wherein the sequence generation neural network has been trained through supervised learning.

20. The method of claim 11, wherein the sequence generation neural network has been trained through reinforcement learning.

21. A system comprising one or more computers and one or more storage devices storing instructions that are operable, when executed by the one or more computers, to cause the one or more computers to perform operations comprising:

receiving metadata specifying (i) a machine learning task and (ii) a set of hyperparameters for training a machine learning model to perform the machine learning task;

generating a metadata sequence that represents the metadata as a sequence of tokens from a vocabulary of tokens; and determining a respective optimized value for each of the hyperparameters in the set, comprising:

at each of a plurality of iterations:

generating one or more trials that each specify a respective value for each of the hyperparameters in the set, comprising, for each trial:

generating an input sequence for the iteration that comprises (i) the metadata sequence and (ii) for any earlier trials performed at any preceding iterations, a respective sequence that represents the respective values for the hyperparameters specified by the earlier trial and a measure of performance for the trial as a sequence of tokens from the vocabulary of tokens, and processing an input sequence for the trial that comprises the input sequence for the iteration using a sequence generation neural network to generate an output sequence for the trial that represents respective values for the hyperparameters in the set as tokens from the vocabulary of tokens; and for each trial, training the machine learning model on a set of training data for the machine learning task with the set of hyperparameters having the respective values specified by the trial and determining a performance measure for the trial based on a performance of the trained machine learning model; and selecting, as the respective optimized values for the hyperparameters, the respective values specified by one of the trials generated at one of the plurality of iterations based on the performance measures for the trials.

* * * * *